UNITED STATES PATENT OFFICE.

JOSEPH P. DONAVON, OF LOMPOC, CALIFORNIA.

INSULATING MATERIAL.

1,345,666.     Specification of Letters Patent.     Patented July 6, 1920.

No Drawing.     Application filed August 28, 1919. Serial No. 320,420.

*To all whom it may concern:*

Be it known that I, JOSEPH P. DONAVON, a citizen of the United States, residing at Lompoc, in the county of Santa Barbara and State of California, have invented new and useful Improvements in Insulating Materials, of which the following is a specification.

The present invention relates to heat insulating material, the object of the invention being to provide a material of this kind which will be inexpensive.

In forming my improved heat insulating material, I mix with diatomaceous earth or similar material, the shells of kernels, either of nuts or fruit, as, for instance, of almonds or the pits of apricots, ground to pass through eight or ten mesh. I mix these substances in the proportion of one part by weight of the fruit pits, and two parts by weight of the diatomaceous earth. In case nut shells are used, as, for instance, almond shells, I take a smaller proportion by weight of said shells on account of their being comparatively light. The fruit pits which I prefer to use are those of apricots. The earth and ground kernel shells are dampened and mixed and molded into the shapes required, then dried and calcined.

The quality of heat insulating material is determined to a considerable extent by the number of voids or air cells within the material, the greater the number of air cells, the greater being the heat insulating properties of the material. I have found that nut shells or fruit pits leave a very small amount of ash when burned and I have taken advantage of this condition in the production of a highly efficient thermal insulation. When the molded shapes are calcined, the shells are reduced to ashes and since the volume of the ash is very small, in comparison with the volume of the shells, a multiplicity of cells or voids are formed within the molded shape.

I claim:—

1. Heat insulating material, comprising kieselguhr and ground kernel shells mixed substantially in the proportion specified, and calcined.

2. Heat insulating material comprising a block of kieselguhr having voids therein formed by the incineration of pieces of kernal shells embedded in the block.

JOSEPH P. DONAVON.